United States Patent [19]
Kish

[11] Patent Number: 5,586,748
[45] Date of Patent: Dec. 24, 1996

[54] DISCONNECT VALVE ASSEMBLY FOR CONNECTING A SOURCE OF FLUID WITH A CONTAINER TO BE FILLED

[75] Inventor: Arthur S. Kish, Sarasota, Fla.

[73] Assignee: JEM Industries, Inc., Willoughby, Ohio

[21] Appl. No.: 413,097

[22] Filed: Mar. 29, 1995

[51] Int. Cl.$^6$ ............................................. F16L 37/28
[52] U.S. Cl. ............................ 251/149.8; 251/149.6; 251/264; 137/614.04; 137/614.05
[58] Field of Search .................... 251/149.1, 149.6, 251/149.8, 264, 149.3, 149.4; 137/614.03, 614.04, 614.05

[56] References Cited

U.S. PATENT DOCUMENTS

| | | | |
|---|---|---|---|
| 4,564,042 | 1/1986 | Ekman | 137/614.05 |
| 4,655,251 | 4/1987 | Nimberger | 251/149.6 X |
| 5,339,862 | 8/1994 | Haunhorst et al. | 137/614.05 |
| 5,415,200 | 5/1995 | Haunhorst et al. | 137/614.05 |
| 5,450,875 | 9/1995 | Chichester et al. | 137/614.05 |
| 5,492,305 | 2/1996 | Kish | 251/149.6 |

OTHER PUBLICATIONS

Aeroquip Corp. Assembly Model No. 2374 as illustrated in FIG. 6 herein and described on incorporated pp. 2 and 3 and 16 through 18 of the application herein.

Primary Examiner—Kevin Lee
Attorney, Agent, or Firm—Tarolli, Sundheim, Covell, Tummino & Szabo

[57] ABSTRACT

A disconnect valve assembly is used to connect a source of fluid with a container to be filled. The valve assembly includes a tubular body having a fluid passageway extending therethrough from an inlet to an outlet. A depressor is located in the passageway intermediate the inlet and the outlet. A ball-valve check assembly is located in the passageway between the inlet and the depressor. This assembly includes a stem body slidably mounted within the passageway. The stem body has a stem passageway extending therethrough including a first passageway portion and a second passageway portion located downstream from the first passageway portion and being of smaller diameter than the first passageway portion. A valve seat interconnects the two portions. A resilient ball member is located in the first passageway portion and a spring serves to normally bias the ball member against the valve seat to prevent passage of fluid therethrough. A depressor is carried by the stem body in a telescoping arrangement therewith. The depressor carries an actuator rod that extends into the stem body for engaging the ball in the ball-valve check assembly. The depressor has a skirt portion having an annular flange which extends radially outward therefrom.

14 Claims, 4 Drawing Sheets

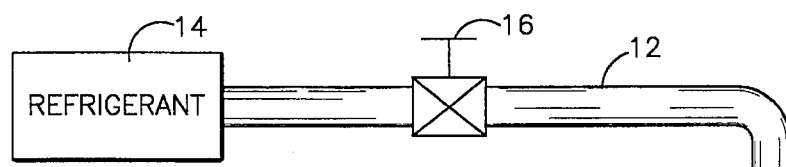
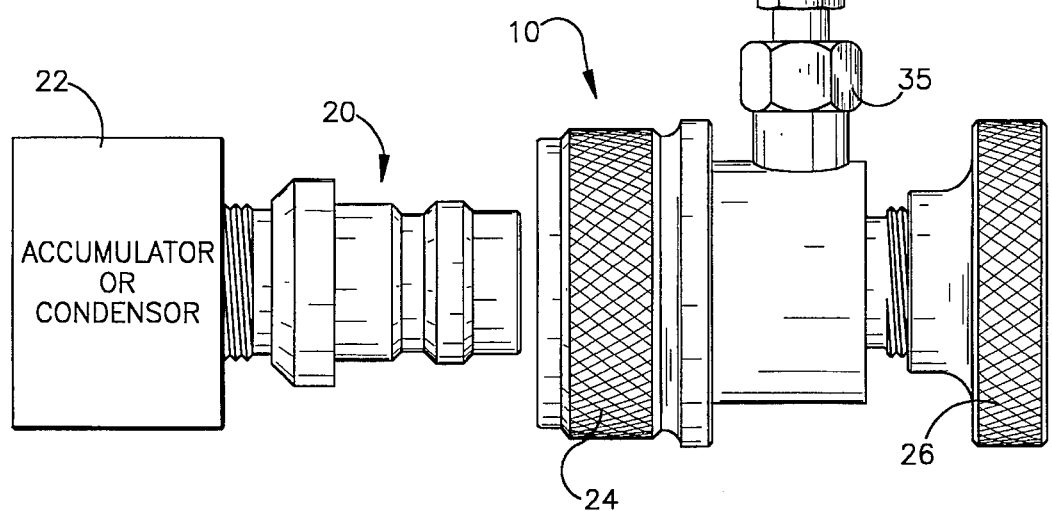
Fig.1
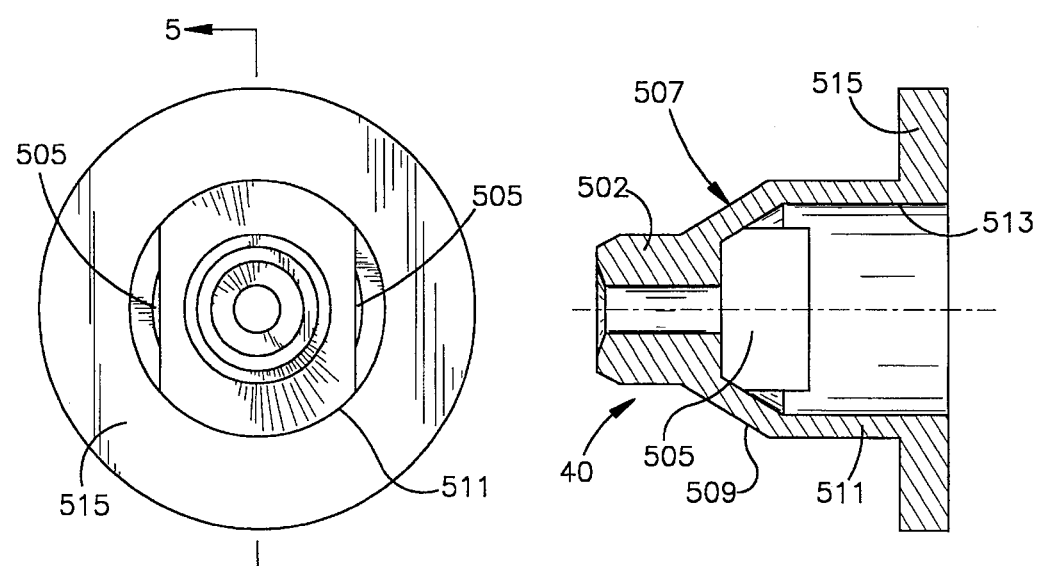
Fig.4
Fig.5

DISCONNECT VALVE ASSEMBLY FOR CONNECTING A SOURCE OF FLUID WITH A CONTAINER TO BE FILLED

RELATED APPLICATION

This application is related to my previously filed application entitled "An Improved Connector Assembly for Connecting a Source of Fluid with a Container to be Filled" filed in the U.S. Patent and Trademark Office on Jan. 12, 1995 under Ser. No. 08/372,058, U.S. Pat. No. 5,492,305 and which application is assigned to the same assignee as the present application.

BACKGROUND OF THE INVENTION

1. Technical Field

This invention relates to the art of disconnect valves and, more particularly, to a self-sealing disconnect valve for use in connecting and disconnecting a source of fluid, such as a refrigerant, with a container, such as an accumulator or a condenser in an air conditioning system, to be filled with fluid.

2. Description of the Prior Art

Disconnect valve assemblies are known in the art for supplying fluid from a fluid source to a container to be filled with fluid. Such valves are frequently employed in dispensing refrigerant into an automotive air conditioning system from a source of refrigerant. The refrigerant may be of the Freon type. It is important that the valve employed for dispensing refrigerants into an air conditioning system does not leak. This is to prevent leakage into the atmosphere which may cause depletion to the earth's ozone layer.

FIG. 1 illustrates an application of the present invention wherein a valve assembly 10 is connected to a hose 12 and which, in turn, is connected to a source of refrigerant 14 by way of a suitable shut-off valve assembly 16. The valve assembly 10 serves as a female connector member and is intended to be connected to a male inlet fitting 20 on an accumulator or condenser container 22 to be filled with refrigerant. The valve assembly 10 is provided with a collar 24 which receives the male fitting 20 in a snap-on type arrangement, to be described in greater detail hereinafter. Initially, a valve within the male fitting 20 is closed and a valve within the valve assembly 10 is also closed. After the fitting 20 is inserted into collar 24, the knob 26 is rotated so that a valve stem within male fitting 20 is engaged and depressed to open a valve within the male fitting. It has been found that continued rotation of the knob 26 may result in damage to such a valve stem. Another valve inside assembly 10 opens during the rotation of knob 26. If the male fitting 20 is inadvertently released from its engagement with valve assembly 10 before shutting off the valve inside assembly 10, the male fitting will be blown off due to high pressure (150 psi) within the valve assembly. For this reason, it is conventional to employ a safety mechanism within the valve assembly 10 so that upon inadvertent disconnection of male fitting 20 an automatic closure of the valve within assembly 10 will take place to prevent such a blow-off of the male fitting. These safety valve arrangements in the past have not employed ball-valve check assemblies as will be described herein. Such a prior art disconnect valve assembly takes the form of assembly Model No. 2374 by Aeroquip Corp. This assembly is illustrated in FIG. 6 herein and described hereinafter in greater detail.

Moreover, some disconnect valve assemblies have tended to damage the valve stem located in the male fitting 20 during assembly because of a lack of adequate means for limiting relative movement of the male fitting and the valve assembly 10 toward each other.

SUMMARY OF THE INVENTION

It is an object of the present invention to provide an improved disconnect valve assembly having means for minimizing damage to a valve stem in a male fitting to be received by the valve assembly.

It is still a further object of the present invention to provide an improved self-sealing disconnect valve assembly having a ball-valve check assembly.

In accordance with one aspect of the present invention, a self-sealing disconnect valve assembly is provided for purposes of connecting a source of fluid with a container to be filled with fluid. The assembly includes a tubular body having a fluid passageway extending therethrough from an inlet to an outlet so that fluid may enter the inlet and exit from the outlet. A depressor is located in the fluid passageway intermediate the inlet and the outlet. A ball-valve check assembly is located within the fluid passageway between the inlet and the depressor. This assembly includes a stem body which is slidably mounted within the fluid passageway. The stem body has a stem passageway extending therethrough between a stem inlet and a stem outlet. The stem passageway has a first passageway portion and a second passageway portion with the latter being located downstream from the former and being of smaller diameter than the former. A valve seat interconnects the first passageway portion with the second passageway portion. A resilient ball member having a diameter greater than the second passageway portion but less than the first passageway portion is located within the first passageway portion. A spring located in the first passageway portion serves to normally resiliently bias the ball member against the valve seat to close the valve to thereby prevent passage of fluid through the stem passageway. The depressor is carried by the stem body for relative movement with respect thereto. The depressor has an actuator extending into the second passageway portion for engaging the ball member. The ball member is displaced by the actuator against the resilient bias of the spring to open the ball-valve check assembly.

BRIEF DESCRIPTION OF THE DRAWINGS

The foregoing and other objects and advantages of the present invention will become more readily apparent from the following description as taken in conjunction with the accompanying drawings, wherein:

FIG. 1 is a plan view showing one application of the invention for interconnecting a source of refrigerant with a container to be filled;

FIG. 4 is an enlarged, elevational view of the depressor;

FIG. 5 is a sectional view taken along line 5—5 looking in the direction of the arrows in FIG. 4.

DESCRIPTION OF PREFERRED EMBODIMENT

Figure 2:
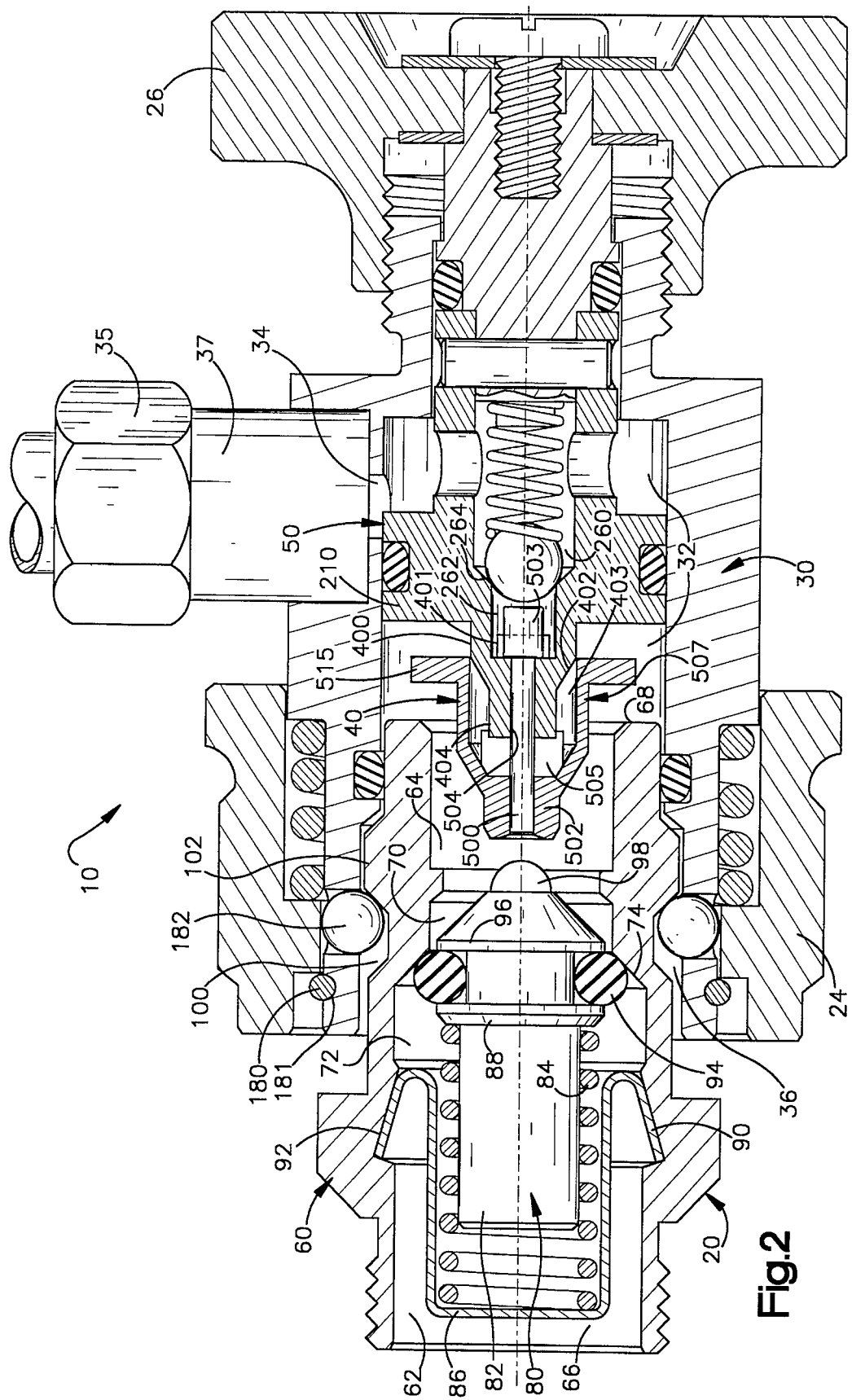
FIG. 2 is an enlarged sectional view illustrating a self-sealing disconnect shut-off valve assembly constructed in accordance with the present invention with the valve being in a closed position.

Reference is now made to the drawings wherein the showings are for the purposes of illustrating a preferred embodiment of the invention only and not for purposes of limiting same.

Referring again to FIG. 1, there is illustrated an application of the present invention wherein a self-sealing disconnect shut-off valve assembly 10, to be described in greater detail hereinbelow, is connected to one end of a reinforced hose 12 with the hose being connected to a source of refrigerant 14 by way of a suitable shut-off valve 16. The valve assembly 10 may be referred to as a female fitting which receives a male fitting 20 for connecting the source of refrigerant with a container 22, which may be an accumulator or a condenser in a refrigeration system.

The disconnect shut-off valve assembly 10, as best viewed in FIGS. 2–5, is mainly constructed of metal parts and includes a tubular body 30 having a fluid passageway 32 extending therethrough from an inlet 34 to an outlet 36 so that fluid may enter the inlet by way of hose 12 mounted to a fitting 35 extending radially outward from the body 30. The fluid that flows through the valve assembly 10 is directed into a male fitting 20 and, thence, beyond a valve within the male fitting into a container 22 to be filled.

A depressor 40 islocated in the fluid passageway 32 intermediate the inlet 34 and the outlet 36.

A ball-valve check assembly 50 is located within the fluid passageway 32 between the inlet 34 and the depressor 40. Before describing the valve assembly 10, in greater detail, reference is now made to the following description of the male fitting The male fitting 20 may take various forms known in the art. Briefly, this fitting is received within the valve assembly 10 and contains a spring-biased valve stem which carries an O-ring for making engagement with a valve seat as will be described below.

Figure 3:
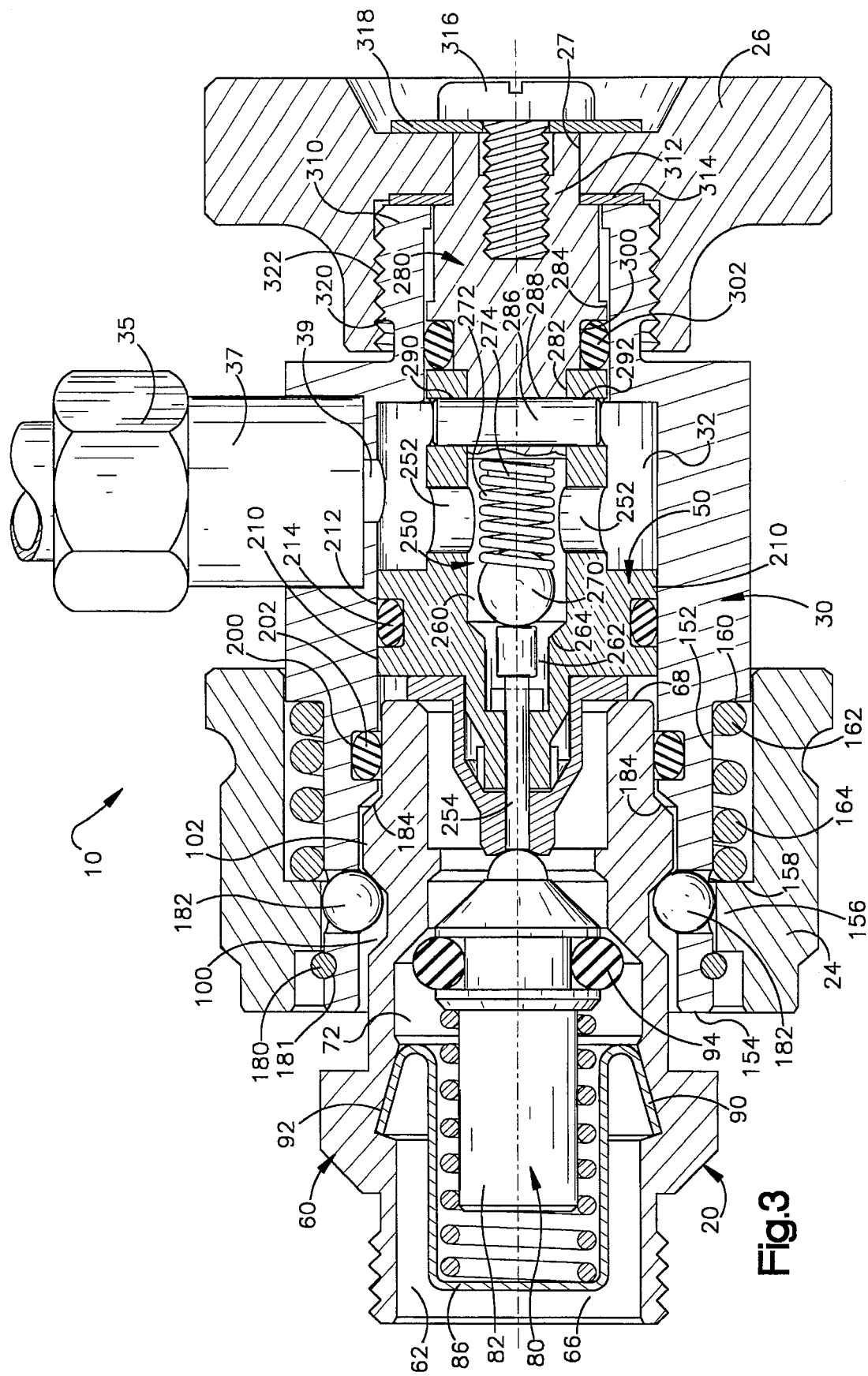
FIG. 3 is a view similar to that of FIG. 2 but showing the valve in an open position.

The male fitting 20 includes a tubular housing 60 having a passageway 62extending therethrough between an inlet 64 and an outlet 66. The inlet 64 terminates in a forward or free end 68 and, which as shown in FIGS. 2 and 3, is received within the fluid passageway 32 of valve assembly 30. Passageway 62 includes a first passageway portion 70 near the inlet 64 and a second passageway 72 extending toward the outlet 66. Portion 72 is of greater diameter than portion 70. An annular valve seat 74 interconnects passageway portions 70 and 72.

A valve stem 80 is located within the passageway 62. The valve stem includes a barrel portion 82 which is coaxially surrounded by a spring 84. The spring 84 is held in place between a retainer 86 and an annular shoulder 88 on the valve stem 80. The retainer 86 has a flared-out portion 90 which is received in a suitable recess 92 in the interior wall of tubular housing 60. The valve stem 80 is resiliently biased by the spring 84 in a direction toward the inlet 64 of the male fitting 20.

The valve stem 80 carries an O-ring 94. This O-ring 94 is carried by the valve stem 80 between shoulder 88 and shoulder 96. When in a valve closed position, the O-ring 94 resiliently bears against the annular valve seat 74. The free end 98 of the valve stem 80 extends toward depressor 40 and is provided with a spherical-shaped surface.

The tubular housing 60 of male fitting 20 has an annular groove 100 located in its outer surface with the floor of the groove being of a diameter corresponding essentially with that of the outer diameter of the tubular housing adjacent the free end 68. This provides a radially extending annular shoulder 102 located between annular groove 100 and the free end 68.

The disconnect valve assembly 10 is provided with an arrangement for slidably receiving the male fitting 20. This arrangement includes a cap or collar 24 which coaxially surrounds the valve body 30 adjacent the outlet 36. The valve body 30is provided with a reduced diameter portion 152 which extends toward the outlet end 154 of the valve body. The collar 24 coaxially surrounds the reduced portion 152. The collar 24 has an inwardly directed annular flange 156 which extends radially inward toward the reduced portion 152. This provides a radially extending shoulder 158 spaced from a radially extending shoulder 160 on body 30. A coiled spring 162 is carried in the space 164 between shoulders 158 and 160. This coiled spring 162 normally biases the collar 24 in a direction toward the left in FIGS. 2 and 3. An annular stop ring 180 carried in an annular recess 181 in body 30 interferes with leftward movement of annular flange 156 and prevents the collar 24 from exiting from the body.

The body 30 is provided with an annular array of steel balls 182 located in suitable apertures in alignment with the annular flange 156. These apertures are provided with narrow openings on the inner side of body 30 to prevent the balls from dropping through the apertures.

During assembly, the male fitting 20 has its free end 68 inserted into the outlet 36 of the body 30. The collar 24 is manually displaced toward the right, as viewed in FIGS. 2 and 3, against the bias of the coiled spring 162. The steel balls 182 are displaced radially outward as they ride up an annular cam surface 184 on the exterior of the male fitting 20 and then the balls move radially inward into the annular groove 100 when the collar is released. The coiled spring 162 returns the collar to the position as shown in FIGS. 2 and 3.

An annular groove 200 is located in the inner surface of valve body 30 and receives an O-ring 202. The O-ring 202 resiliently bears against the outer surface of male fitting 20 to provide a fluid-tight seal therebetween.

The stem body 50 is slidably mounted within fluid passageway 32. More specifically, the stem body 50 has an intermediate body portion 210 of circular cross section and which is slidably received within the fluid passageway 32. The intermediate body portion 210 is provided with an annular groove 212 which receives an O-ring 214. O-ring 214 makes a fluid-tight seal against the interior walls of fluid passageway 32 while the stem body 50 is displaced back and forth.

The stem body 50 includes a stem passageway 250 extending through the stem body between an inlet 252 and an outlet 254. The inlet 252 communicates with fluid passageway 32 and also with hose 12 by way of fitting 35. This fitting 35 has a threaded bore which extends downwardly toward and then communicates with a bore located in a sleeve 37. The bore in sleeve 37 communicates with passageway 32 by way of a bore 39 in body 30.

The stem passageway 250 has a first passageway portion 260 and a second passageway portion 262 located downstream from the first passageway portion. Passageway portion 260 is of greater diameter than passageway portion 262. An annular valve seat 264 separates the first passageway portion 260 from the second passageway portion 262. A resilient ball member 270, which may be constructed of rubber, is located in the stem passageway 250. This ball member 270 has a diameter greater than that of the second passageway portion 262 but less than that of the first passageway portion 260. A coiled spring 272 is located in the first passageway portion 260 intermediate the ball member 270 and a spring retainer 274 for normally resiliently biasing the ball member against the valve seat 264 for closing the valve and preventing fluid from flowing from the first passageway portion 260 to the second passageway portion 262.

The spring retainer 274 is a post which extends axially from a valve stem 280 which extends into the passageway 250 of the stem body 50. The post is received within one end of coiled spring 272. Valve stem 280 has a reduced diameter portion 282 and an enlarged diameter portion 284. The reduced diameter portion 282 extends into the stem passageway 250 of the stem body 50 and is secured to the stem body by means of a pin 286 that extends radially through a bore 288 in the reduced diameter portion 282. The opposing ends of pin 286 are received in suitable apertures 290 and 292 in stem body 50. Consequently as valve stem 280 is rotated about its axis, the pin 286 causes body 50 to also rotate about its axis. In this manner, rotation of knob 26 causes movement of stem body 50 toward the left or the right, as viewed in FIGS. 2 and 3.

The valve stem 280 has an annular groove 300 therein for receiving an O-ring 302. O-ring 302 provides a fluid-tight seal between valve stem 280 and the surrounding walls of the valve body 30 during movement of the valve stem.

The valve body 30 has a reduced diameter sleeve portion 310 that coaxially surrounds and receives the valve stem 280. The valve stem 280 extends beyond the open end of sleeve portion 310 and includes a reduced diameter portion 312. This reduced diameter portion 312 extends through an annular spring washer 314 and, thence, through a central aperture 27 in the knob 26. A bolt 316 extends through the aperture of a washer 318 and is then threaded into the reduced diameter portion 312 of valve stem 280. The exterior surface of sleeve portion 310 is provided with threads 320 for threadably receiving threads 322 on the internal side of knob 26. Knob 26 may be rotated about its axis of rotation between a knob retracted or valve closed position, as shown in FIG. 2, to a knob extended or valve open position, as shown in FIG. 3.

The stem body 50 has a cylindrical portion 400 extending forwardly in the downstream direction from the intermediate body portion 210. This cylindrical portion 400 coaxially surrounds a portion of the length of the second passageway portion 262. The cylindrical portion 400 then tapers radially inward to provide a tapered portion 402 terminating in another cylindrical portion 404 of considerably less diameter than that of portion 400. Cylindrical portions 402 and 404 coaxially surround and slidably receive a portion of an actuator rod 500 extending from the depressor 40. This actuator rod 500 has its forward or downstream end mounted in the roof 502 of depressor 40 and extends upstream therefrom through a passageway 504 in cylindrical portion 404. The rod then extends into the second passageway portion 262. Actuator rod 500 includes a pusher portion 503 of greater diameter than the passageway 504. Pusher portion 503 is of smaller diameter than that of second passageway portion 262. This pusher portion 503 holds the depressor 40 in place on the forward end of body 50. The actuator rod 500 is axially slidable within the passageway 504 between a valve closed position, as shown in FIG. 2, and a valve open position, as shown in FIG. 3. In FIG. 3, the pusher portion 503 is shown as engaging valve ball 270 and displacing it to the right, away from the valve seat 264 to open the valve. The cylindrical portion 400 is also provided with an opening 401 (there being a second opening in an opposing wall) to permit fluid to flow from second passageway 262 into passageway 32, when the valve is open. This opening 401 communicates with a surrounding chamber 403 between cylindrical portion 404 and the coaxially surrounding skirt 505 of depressor 40. This permits fluid to flow from the second passageway 262 and, thence, through aperture 401 into chamber 403. From chamber 403 the fluid flows downstream through an aperture 505 in the skirt portion 507 of depressor 40.

The depressor 40 is shown in greater detail in FIGS. 4 and 5 to which attention is now directed. The depressor 40 includes a roof 502 and a skirt 507. The skirt 507 has a tapered portion 509 and a cylindrical sleeve portion 511. An aperture 505 is located in the sidewall of the tapered portion 509 of the skirt 507.

It is to be noted that when the body 50 is being driven to the left as viewed in FIGS. 2 and 3, its cylindrical portion 400 is slidably received within a bore 513 in the skirt 507 of the depressor 40. This continues until the roof 502 of the depressor 40 engages the free end 98 of the valve stem 80 in fitting 60 to drive that valve stem to the left to an open position, as is seen in FIG. 3. Further movement of depressor 40 is prevented by means of a depressor stop taking the form of annular flange 515 extending radially outwardly from skirt 507 of depressor 40. This flange 515, during leftward movement as discussed above, strikes the free end 68 of fitting 60 to prevent further movement in a leftward direction of depressor 40 as the knob 26 is being turned in a clockwise direction about its axis of rotation. This prevents damage, such as bending or the like, to the valve stem 80.

As knob 26 is further rotated in a clockwise direction, actuator pusher portion 503 engages the rubber ball 270 and displaces it away from the valve seat 264 against the resilient bias of spring 272 to a valve open position, as is shown in FIG. 3. At this point, the annular flange 515 extending from depressor 40 is sandwiched between the free end 68 of fitting 60 and the left side (as viewed in FIGS. 2 and 3) of the intermediate portion 210 of stem body 50.

It is seen that after the fitting 60 has been inserted into the disconnect valve assembly, the valve in the fitting 20 and the valve in assembly 10 are closed. As the knob 26 is rotated in a clockwise direction, the two valves open. Which valve opens first is dependent upon the relative values of the springs 84 and 272.

After both of the valves have been opened by turning the knob 26 in a clockwise direction, approximately three turns, refrigerant will flow freely to fill container 22. After the container 22 has been filled with fluid, it is contemplated that the valve assembly 10 will be disconnected from the male fitting 20. Preferably, this is done by first closing the valves by rotating knob 26 in the opposite or counterclockwise direction about its axis of rotation. This will return the valves to the valve closed positions, as is indicated in FIG. 2. At that point, the fitting may be disconnected from assembly 10 by manually sliding collar 24 to the right as viewed in FIGS. 2 and 3.

It is contemplated that an operator may forget to close the valves by turning knob 26 before attempting to disconnect the male fitting 20 from the valve assembly 10. In such case, both valves are open at the point of disconnection. The pressure from the refrigerant flowing into the inlet of the valve assembly is on the order of 150 psi. Consequently, with the male fitting 20 removed, fluid at this high pressure will act on ball 270 and be assisted by the force of spring 272 to cause ball 270 to move to the left and engage the valve seat 264 to close the ball check valve. This is a safety feature to provide a self-sealing function in the event of an improper disconnect operation.

Figure 6:
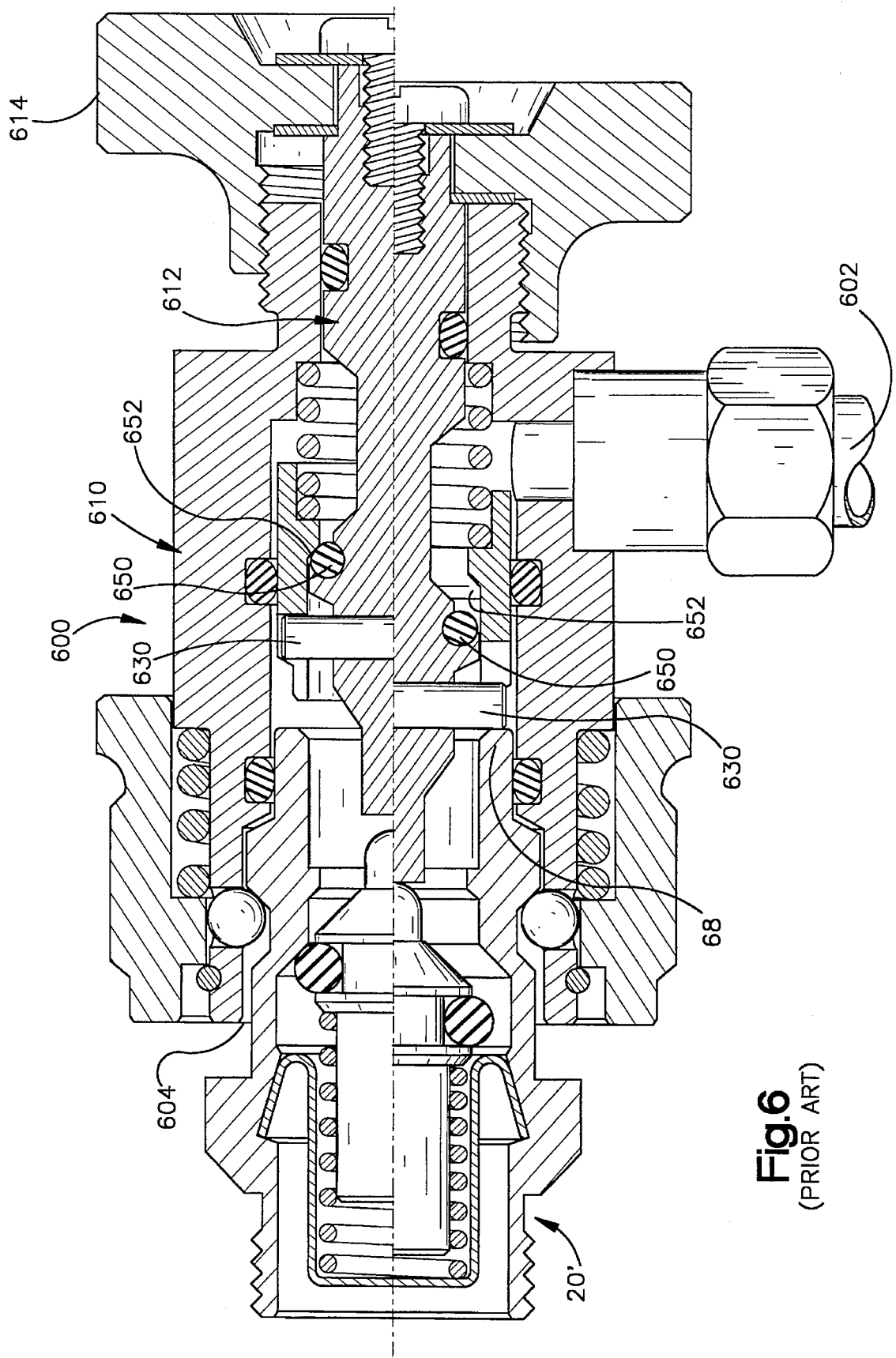
FIG. 6 is an enlarged sectional view similar to FIGS. 2 and 3 but illustrating a prior art disconnect valve assembly.

Reference is now made to FIG. 6 which illustrates a prior art disconnect shut-off valve assembly 600 and takes the form of Assembly Model No. 2374 provided by Aeroquip Corp. This valve assembly is shown as receiving a male fitting 20' constructed exactly as the male fitting 20, shown in FIGS. 2 and 3 herein. This prior art valve assembly 600, like the valve assembly illustrated in FIGS. 2 and 3, includes an inlet 602 and an outlet 604 interconnected by means of a passageway therebetween. This passageway receives the male fitting 20' in the outlet 604 in the same manner as described hereinbefore with reference to FIGS. 2 and 3. Valve assembly 600 includes a body 610 which coaxially surrounds a passageway that receives a valve stem 612. Valve stem 612 may be driven in an axial direction by a suitable knob 614 which is fixed to the valve stem 612. Knob 614 is threaded to suitable threading on the valve body 610. The valve stem 612 is shown on the upper half of the drawing as being in a retracted position during which the valve within the male fitting 20' is closed and the valve within body 610 is closed. These two valves are shown in the open position in the lower half of the drawing wherein the knob 614 has been tightened onto the body 610 to drive the valve stem 612 in an axial direction to the left. The valve stem 612 carries a radially extending pin 630 which, in the valve open position, as shown in the lower half of the drawing engages the free end 68 of the male fitting 20. This prevents the valve stem 612 from moving further to the left as viewed in the lower half of FIG. 6 and damaging the valve stem in fitting 20'. This pin 630 serves essentially the same function as the annular flange 613 which extends radially outward from the skirt portion 605 of the depressor 40 (as is best seen in FIGS. 2–5). It is to be noted that pin 630 may itself be bent and otherwise damaged during repetitive use. The annular flange 615 in FIGS. 2–5 is a solid continuous flange, as is best seen in FIG. 5, and is sandwiched between the free end 68 of fitting 20 and the intermediate portion 210 of the valve stem 50 when the valves are driven to an open position as is shown in FIG. 3.

It is also noted that the valve stem 612 in FIG. 6 carries an annular O-ring 650 which serves to engage an annular valve seat 652 carried by body 610. There is no teaching of a ball-valve check assembly carried by the valve stem, as in the case of the invention as disclosed in FIGS. 2 and 3 herein.

Although the invention has been described in conjunction with a preferred embodiment, it is to be appreciated that various modifications may be made without departing from the spirit and scope of the invention as defined by the appended claims.

Having described the invention, I claim the following:

1. A disconnect valve assembly for connecting a source of fluid with a container to be filled with fluid and comprising:

a tubular body having a fluid passageway extending therethrough from an inlet to an outlet so that fluid may enter said inlet and exit from said outlet;

a depressor located in said passageway intermediate said inlet and said outlet;

a ball-valve check assembly located within said passageway between said inlet and said depressor, said assembly including a stem body slidably mounted within said fluid passageway and having a stem passageway extending therethrough between a stem inlet and a stem outlet, said stem passageway having a first passageway portion and a second passageway portion with said second passageway portion being located downstream from said first passageway portion and being of smaller diameter than said first passageway portion, a radially extending valve seat interconnecting said first passageway portion and said second passageway portion, a ball member having a diameter greater than said second passageway portion but less than said first passageway portion located within said first passageway portion, and spring means located in said first passageway portion for normally resiliently biasing said ball member against said valve seat for preventing passage of fluid through said stem passageway from said first passageway portion to said second passageway portion;

said depressor being carried by said stem body and mounted thereon for relative movement with respect thereto downstream from said second passageway portion, said depressor having an actuator means extending therefrom toward said ball-valve check assembly and extending into said second passageway portion for engaging said ball member upon relative movement of said depressor and said stem body toward each other for displacing said ball member against the resilient bias of said spring means to thereby open said ball valve assembly permitting fluid to flow from said inlet to said outlet;

means for imparting slidable movement of said stem body in a first direction and in an opposing second direction; and means for limiting movement of said depressor in said first direction whereupon further movement of said stem body in said first direction causes relative movement of said depressor and said stem body toward each other for displacing said ball member toward said ball valve assembly.

2. A valve assembly as set forth in claim 1 wherein said limiting means includes an annular flange extending outwardly from said depressor and adapted to engage a valve fitting received in the outlet of said tubular body.

3. A valve assembly as set forth in claim 2 wherein said flange is a continuous annular flange extending radially outward from said depressor.

4. A valve assembly as set forth in claim 1 wherein said tubular body has a collar mounted thereon adjacent said body outlet carrying an annular array of metal balls with each ball being located in an aperture in said tubular body, said body outlet adapted to receive a valve fitting therein with said valve fitting having an annular groove for receiving said balls, said collar having a first position wherein a radially inwardly directed shoulder of said collar normally bears against said balls so that said balls are directed radially inward into the said annular groove in said fitting, spring means for normally biasing said collar to said first position relative to said body, said collar being movable against the bias of said spring to a second position relative to said body whereupon said shoulder is displaced from said balls permitting said balls to be displaced radially outward as said fitting is inserted or removed from said outlet.

5. Apparatus as set forth in claim 4 wherein said depressor has an annular flange extending outwardly therefrom and adapted to engage a first end of said fitting when said fitting is received in said outlet and prevent relative movement therebetween.

6. A valve assembly as set forth in claim 5 wherein said flange is a continuous annular flange extending radially outward from said depressor.

7. A valve assembly as set forth in claim 1 wherein said depressor is cup-shaped having a roof portion and an annular skirt portion extending in an axial direction from said roof portion and coaxially surrounding at least a portion of the length of said depressor actuator means.

8. A valve assembly as set forth in claim 7 wherein said depressor actuator means is an elongated rod having a first end connected to said roof portion and an opposite second end extending beyond said skirt portion in the direction of said inlet.

9. A valve assembly as set forth in claim 8 wherein said rod has a free end which extends beyond said skirt portion of said depressor and into said second passageway portion in said stem body.

10. A valve assembly as set forth in claim 9 wherein said stem body has a downstream portion that coaxially surrounds a portion of the length of said elongated rod.

11. A valve assembly as set forth in claim 10 wherein said stem body has a fluid opening extending radially outward from said second passageway so that fluid in said second passageway may pass through said opening.

12. A valve assembly as set forth in claim 11 wherein said downstream portion of said stem body is slidably received within said depressor skirt portion for slidable movement relative thereto.

13. A valve assembly as set forth in claim 12 wherein said depressor has a fluid opening defined therein so that fluid may flow through said depressor opening toward said outlet.

14. Apparatus as set forth in claim 13 wherein said means for imparting slidable movement to said stem body includes manually operable knob means interconnecting said knob with said stem body for imparting movement thereto.

* * * * *